(12) United States Patent
Wallther

(10) Patent No.: US 8,910,447 B2
(45) Date of Patent: Dec. 16, 2014

(54) MECHANICAL COUPLING ARRANGEMENT FOR A LATTICE SUPPORT BEAM

(75) Inventor: Harry Wallther, Hindas (SE)

(73) Assignee: PlusEight Technology AB, Hindas (SE)

( * ) Notice: Subject to any disclaimer, the term of this patent is extended or adjusted under 35 U.S.C. 154(b) by 0 days.

(21) Appl. No.: 13/984,003

(22) PCT Filed: Feb. 6, 2012

(86) PCT No.: PCT/SE2012/050106
§ 371 (c)(1),
(2), (4) Date: Aug. 6, 2013

(87) PCT Pub. No.: WO2012/108821
PCT Pub. Date: Aug. 16, 2012

(65) Prior Publication Data
US 2013/0312360 A1 Nov. 28, 2013

(30) Foreign Application Priority Data

Feb. 7, 2011 (SE) .......................................  1150087

(51) Int. Cl.
*E04C 3/02* (2006.01)
*E04B 1/41* (2006.01)
*E04C 3/08* (2006.01)
*B23P 15/00* (2006.01)
*E04C 3/04* (2006.01)

(52) U.S. Cl.
CPC ... *E04B 1/40* (2013.01); *E04C 3/02* (2013.01); *E04C 2003/0491* (2013.01); *E04C 3/08* (2013.01); *B23P 15/00* (2013.01)
USPC ...................................................... 52/655.1

(58) Field of Classification Search
CPC .............. E04C 2003/0491; E04C 3/08; E04C 2003/0486
USPC .................................. 52/655.1, 665, 690, 693
See application file for complete search history.

(56) References Cited

U.S. PATENT DOCUMENTS

| | | | |
|---|---|---|---|
| 2,031,765 A * | 2/1936 | Ferguson ........................ | 52/691 |
| 3,849,961 A * | 11/1974 | Gwynne ......................... | 52/639 |
| 5,090,166 A | 2/1992 | Johnson et al. | |
| 5,197,818 A * | 3/1993 | Johnson ........................ | 403/217 |
| 6,892,502 B1 * | 5/2005 | Hubbell et al. ................. | 52/633 |
| 7,140,155 B1 | 11/2006 | Nasimov | |
| 2007/0261355 A1 * | 11/2007 | Carlisle et al. .................. | 52/633 |
| 2013/0312360 A1 * | 11/2013 | Wallther ........................ | 52/660 |

FOREIGN PATENT DOCUMENTS

GB          2456877 A         8/2009

* cited by examiner

*Primary Examiner* — Andrew J Triggs
(74) *Attorney, Agent, or Firm* — Knobbe Martens Olson & Bear LLP

(57) ABSTRACT

Disclosed herein is a mechanical coupling arrangement for a lattice support beam having a longitudinal direction and a transverse direction, said mechanical coupling arrangement comprising at least a first chord member, a first diagonal member, and a connector element for joining said first chord member with said first diagonal member, wherein each of said first chord member, said first diagonal member, and said connector element is made of extruded aluminum profile, said connector element comprising at least a first attachment portion having a first contact surface in contact with said first chord member, and a second attachment portion having a second contact surface in contact with an abutment surface of said first diagonal member.

20 Claims, 6 Drawing Sheets

MECHANICAL COUPLING ARRANGEMENT FOR A LATTICE SUPPORT BEAM

CROSS-REFERENCE TO RELATED APPLICATIONS

This application is the U.S. National Phase under 35. U.S.C. §371 of International Application PCT/SE2012/050106, filed Feb. 6, 2012, which claims priority to Swedish Patent Application No. 1150087-3, filed Feb. 7, 2011.

TECHNICAL FIELD

The present invention relates to a mechanical coupling arrangement for a lattice support beam having a longitudinal direction and a transverse direction, and a method for manufacturing such a coupling arrangement. The mechanical coupling arrangement comprising at least a first chord member, a first diagonal member, and a connector element for joining said first chord member with said first diagonal member.

BACKGROUND ART

Lattice beams are traditionally made by welding together chord members with diagonal members. Prior art document GB 927,917 discloses a welded, three-dimensional lattice girder consisting of rod-like members, wherein the materials suitable for making the panel-type lattice girder include steel, aluminium, plastic and any other weldable material. The disadvantage with this design is low load bearing capacity, at least when aluminium is used.

There is thus a need for an improved lightweight lattice beam removing the above mentioned disadvantages.

SUMMARY

The object of the present invention is to provide an inventive mechanical coupling arrangement for a lattice support beam, wherein said mechanical coupling arrangement having a longitudinal direction and a transverse direction, and comprising at least a first chord member, a first diagonal member, and a connector element for joining said first chord member with said first diagonal member, where the previously mentioned problems are partly avoided. This object is achieved by the features of the characterising portion of claim 1, wherein each of said first chord member, said first diagonal member, and said connector element is made of extruded aluminium profile, wherein said connector element comprises at least a first attachment portion having a first contact surface in contact with said first chord member, and a second attachment portion having a second contact surface in contact with an abutment surface of said first diagonal member, wherein said first contact surface comprises at least one rib-shaped projection extending in said transverse direction and engaged in at least one corresponding groove-shaped recess arranged in said first chord member, and wherein said second contact surface is pressed against said abutment surface of said first diagonal member by means of at least one fastener, whose longitudinal direction is arranged substantially parallel with a longitudinal direction of said first diagonal member.

Coupling arrangements of lattice beams joined by welding of aluminium diagonal members to aluminium chord members suffer from severely weakening of the material in the heat affected zone, both in short term as well as long term due to fatigue. Hence, the allowed stresses in the heat affected zone are very limited, resulting in a relatively low load bearing capacity. Possible remedies are either to provide the members of the coupling arrangement with increased thickness of material, or using other materials, such as steel. Both alternatives however lead to increased weight of the lattice beam. The coupling arrangement according to the invention solves this problem by providing a mechanical coupling arrangement where welding of the beam members is no longer required.

An important aspect of mechanical coupling arrangements is the amount of mechanical play present in the coupling arrangement during alternating loading thereof. Mechanical play in the coupling arrangement leads to reduced load bearing capacity because said mechanical play accumulates from each coupling arrangement and results in increased beam deflection under high load, leading to weakening of the beam strength, as well as affecting the natural frequency of the lattice beam. The source of play in mechanical coupling arrangements may come from the arrangement of mechanical fasteners used in the design of the coupling arrangement. The use of pins or threaded fasteners arranged perpendicular to the load transfer direction often give raise to play due to the difference in diameter between the pin/threaded member and the hole, in which the pin/threaded member is arranged. The coupling arrangement according to the invention solves this problem by providing a mechanical coupling arrangement where the fastener is arranged substantially parallel with a longitudinal direction of the diagonal member. The play in the connection between the connector element and the diagonal member is thereby completely eliminated.

A further important aspect of mechanical coupling arrangements is the level of shear force exerted on any clamping means that presses said first contact surface against said first chord member. The shear force results from the transfer of compression and tensile force in the diagonal member to and from the chord member. The shear force is normally transferred to the chord member partly by frictional resistance at the contact surface between the chord member and the diagonal member, and partly by the clamping means itself that is used for clamping the first contact surface against the first chord member. Increased clamping stresses give raise to increased frictional resistance and alleviate thus the clamping means to a certain extent. High strength friction grip bolts that provides increased frictional resistance by increased clamping force can however only be applied to a certain extent in aluminium beam constructions due to the difference in thermal expansion between the steel material of the high strength friction grip bolts and the aluminium material of the chord- and diagonal members. The coupling arrangement according to the invention solves this problem by providing a mechanical coupling arrangement where said first contact surface comprises at least one rib-shaped projection extending in said transverse direction and engaged in at least one corresponding groove-shaped recess arranged in said first chord member. The engagement of the rib-shaped projection in the groove-shaped recess provides an efficient and cost-effective solution for transferring compression and tensile loads between the first diagonal member and the first chord member, thus at least partly relieving the clamping means from shear stresses. As a consequence thereof, the clamping means may be made smaller and/or consisting of fewer members with maintained or reduced stress levels.

In total, the inventive mechanical coupling arrangement provides a lightweight lattice beam having relatively high load bearing capacity.

The object of the present invention is further additionally to provide an inventive method for manufacturing a mechanical coupling arrangement where the previously mentioned problems are partly avoided. This object is achieved by the features of the characterising portion of claim 15, which comprises the steps of extruding and cutting a first aluminium profile forming said first chord member, and machining at least one groove-shaped recess in said first chord member. Extruding and cutting a second aluminium profile forming said first diagonal member comprising an abutment surface. Extruding a third aluminium profile having a cross-sectional shape corresponding substantially to the cross-sectional shape of the connector element in a plane perpendicular to said transverse direction, and cutting said third aluminium profile in longitudinal sections to produce at least one separate connector element comprising at least a first attachment portion having a first contact surface, and a second attachment portion having a second contact surface, wherein said first contact surface comprises at least one rib-shaped projection extending in said transverse direction. Assembling at least said first chord member, said first diagonal member, and said connector element, such that said first contact surface contacts said first chord member, said second contact surface contacts said abutment surface, and said at least one rib-shaped projection engages said at least one groove-shaped recess. And finally, pressing said second contact surface against said abutment surface by means of at least one fastener, whose longitudinal direction is arranged substantially parallel with a longitudinal direction of said first diagonal member.

Further advantages are achieved by implementing one or several of the features of the dependent claims. The first contact surface is advantageously pressed against said first chord member by means of at least one fastener for providing a fast, reliable and cost-efficient solution of joining and clamping said parts.

The at least one fastener is advantageously arranged in a hole or cut-out of said first attachment portion, and in a corresponding hole or cut-out of said first chord member for providing a compact design of the mechanical coupling arrangement.

The connector element is advantageously made of a longitudinal section of said extruded aluminium profile for providing a cost-effective and flexible manufacturing process of the mechanical coupling arrangement.

The second attachment portion advantageously comprises a flange, which comprises at least one hole or cut-out located therein, which hole or cut-out at least partly surrounds said at least one fastener. A flange provides a light-weight and strong design of the second attachment arrangement.

The flange advantageously has a rectangular shape and comprising one hole or cut-out in each corner region thereof. The rectangular shape is an economical shape because the rectangular shape is a direct result of the manufacturing process of the connector element. No substantial modifications of the flange are thus required to obtain the finished connector element. Moreover, the rectangular shape corresponds excellent with a rectangular shape of the diagonal members.

The connector element further advantageously comprises at least a planar body portion connecting said first and second attachment portions, wherein a plane of said flange is perpendicular to a plane of said planar body portion. The forces to and from the diagonal member is then efficiently transferred between the flange and the first attachment portion, without giving raise to substantial bending torque in the planar body portion. The planar configuration is also a result the economical manufacturing process of the connector element.

The first contact surface advantageously comprises at least two rib-shaped projections extending in said transverse direction and engaged in at least two corresponding groove-shaped recesses arranged in said first chord member, and preferably at least three rib-shaped projections extending in said transverse direction and engaged in at least three corresponding groove-shaped recesses arranged in said first chord member. The number, form, size, and separation distance of the rib-shaped projections and groove-shaped recesses are selected to suit the specific demands of each lattice support beam.

The at least one rib-shaped projection advantageously extends in said transverse direction over the entire transverse length of said connector element. This simplifies manufacturing of the connector element.

The at least one rib-shaped projection advantageously has a conical cross-sectional shape in a first plane defined by said longitudinal direction and a web direction, and/or said at least one corresponding groove-shaped recess has a conical cross-sectional shape in said first plane. The conical cross-sectional shape reduces or eliminates the level of play in the connection between said chord member and said connector element.

The at least one rib-shaped projection is advantageously oversized with respect to said at least one corresponding groove-shaped recess, such that a level of play in the connection between said first chord member and said connector element is reduced or eliminated.

The at least one rib-shaped projection is advantageously integrally formed during extrusion of said connector element, and the at least one corresponding groove-shaped recess of said chord member is mechanically produced, preferably by a cutting or milling operation, after extrusion of said chord member. This simplifies and provides a more economical manufacturing of the connector element.

The fastener is advantageously provided with threads, and the first diagonal member is advantageously provided with at least one integrally formed attachment bore for threadingly receiving said at least one fastener. This simplifies and provides a more economical manufacturing of the diagonal element, and makes a strong connection possible.

The at least one fastener connecting said connector element with said first diagonal member is advantageously a thread-forming screw. Thereby, no additional prior thread forming step must be performed.

The mechanical coupling arrangement further advantageously comprises a second diagonal member made of extruded aluminium profile, said connector element further comprises a third attachment portion having a third contact surface in contact with an abutment surface of said second diagonal member, and said third contact surface is pressed against said abutment surface of said second diagonal member by means of at least one fastener, whose longitudinal direction is substantially parallel with a longitudinal direction of said second diagonal member. A mechanical coupling arrangement connecting two diagonal members to a chord member, wherein each diagonal member has an individual orientation is a favourable alternative if the diagonal members are closely arranged. A connector element for a single diagonal member is more favourable if the diagonal members are arranged more distributed.

BRIEF DESCRIPTION OF THE DRAWINGS

The present invention will now be described in detail with reference to the figures, wherein.

DETAILED DESCRIPTION

Figure 1:
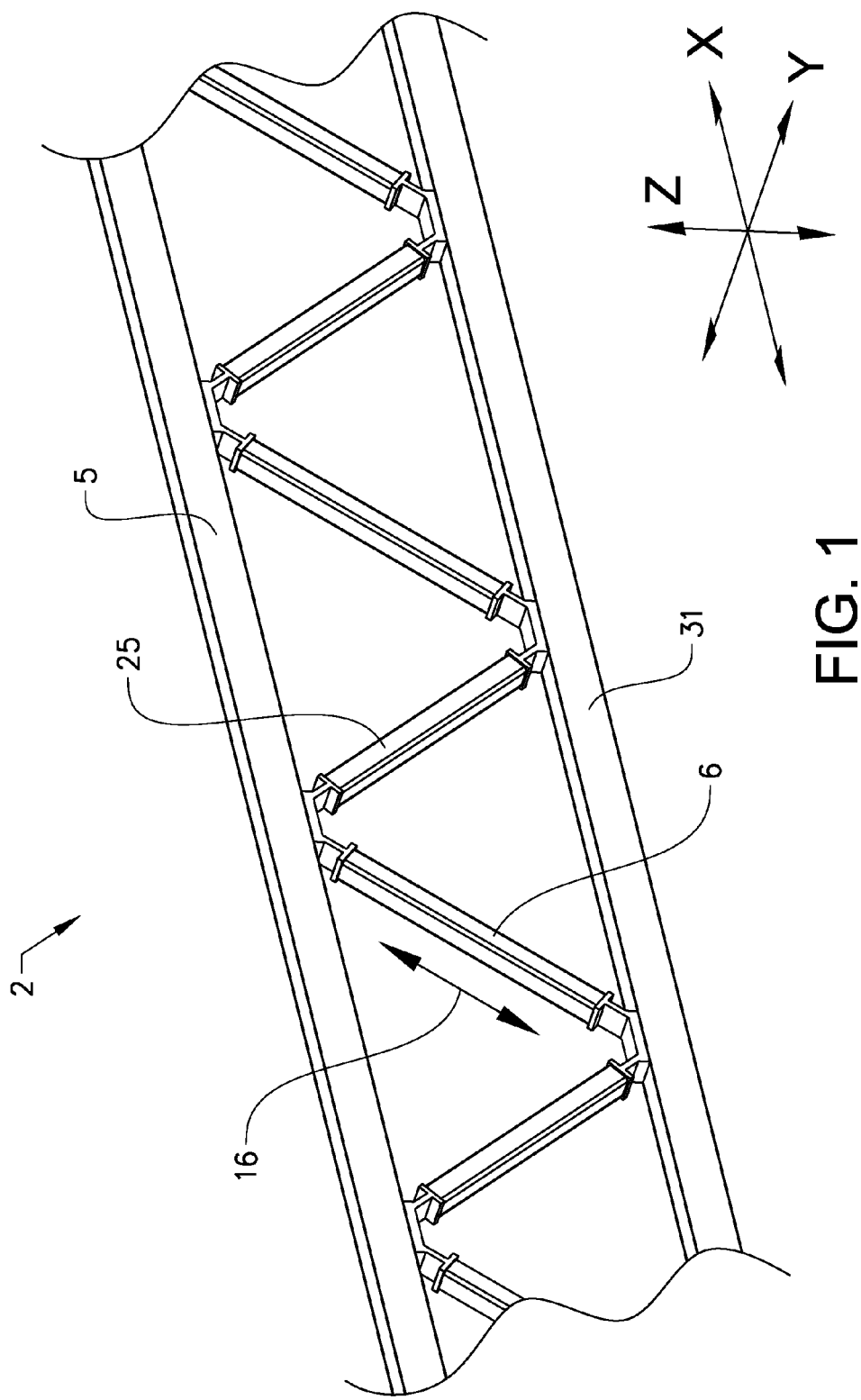
FIG. 1 shows a perspective view of a part of a lattice support beam according to the invention.

FIG. 1 shows schematically a aluminium lattice support beam 2 according to the invention, comprising a first chord member 5, a second chord member 31, and a plurality of diagonal members 6, 25 interconnecting said first and second chord members 5, 31. Mechanical coupling arrangements 1 are provided for connecting each of said chord members 5, 31 with corresponding diagonal member 6, 25. Each of the mechanical coupling arrangements 1 comprises a longitudinal direction X, a transverse direction Y perpendicular to the longitudinal direction X, and a web direction Z perpendicular to both the longitudinal direction X and the transverse direction Y. The longitudinal direction X and the web direction Z together define a first plane, which may also be labelled vertical plane in case the support beam 2 is essentially two-dimensional and arranged upright with the first chord member 5 on top of the second chord member 31. When the lattice support beam comprises two straight and parallel chord members, as illustrated in FIG. 1, said directions X, Y, Z will be identical for all coupling arrangements of that support beam 2, and when the first chord member 5 has a curved shape, the longitudinal direction X is defined by the tangent line to the curved chord member 5 at a central attachment point of the mechanical coupling arrangement.

Figure 2:
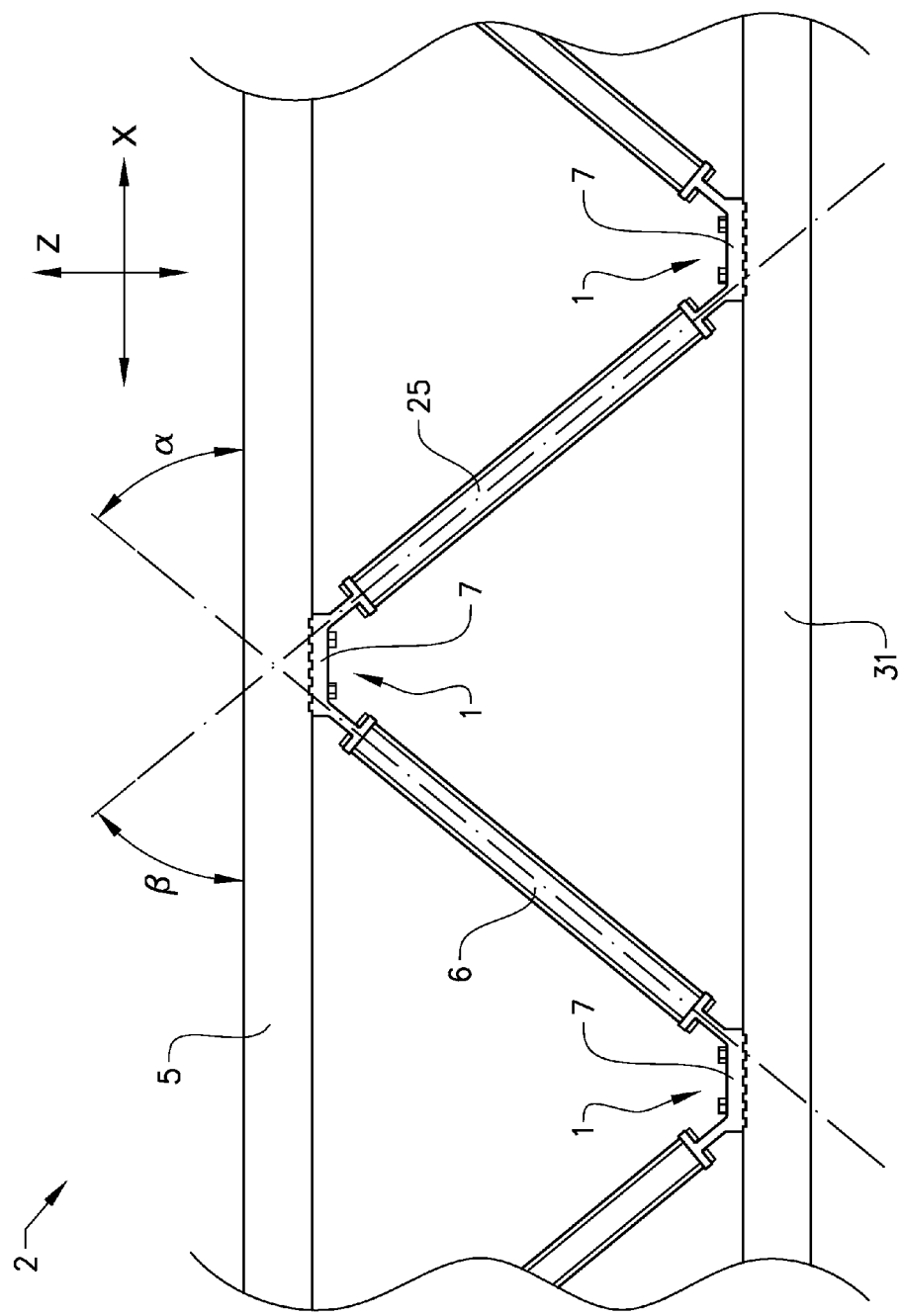
FIG. 2 shows a side view of the lattice support beam of FIG. 1.

FIG. 2 illustrates a side view of the lattice support beam 2 of FIG. 1 having a plurality of mechanical coupling arrangements 1 according to a first embodiment of the inventive. All coupling arrangements 1 of the same lattice support 2 beam are preferably identical in form and shape for minimizing the number of different part required for manufacturing of the lattice support beam 2. The mechanical coupling arrangements 1 mechanically connect the first chord member 5 with a first and a second diagonal member 6, 25 by means of a connector element 7. Each of the first chord member 5, the first and second diagonal members 6, 25, and the connector elements 7 is made of extruded aluminium profile for the purpose of providing a light-weight lattice support beam that may be manufactured by a cost-efficient process. The aluminium material is an aluminium alloy suitable for extrusion, and of high strength. The first chord member 5 as well as the first and second diagonal members 6, 25 are preferably made hollow to further enhance strength and reduce weight of said members. The connector element 7 according to the first embodiment is made of a solid aluminium profile, but may alternatively be made of hollow profile depending on desired shape and use of the lattice support beam.

The inclination angle α and β of the first diagonal member respectively the second diagonal member 25 with respect to the first chord member 5 is normally within the range of >0° to <90°, i.e. such that the diagonal members 6, 25 are neither perpendicular nor parallel to the chord members 5, 31. The final inclination angle is selected in accordance with at least the overall shape, dimensions, required load bearing capacity of the lattice support beam 2, as well as material strength and dimensions of the individual members 5, 6, 25, 31 of the lattice support beam 2.

Figure 3:
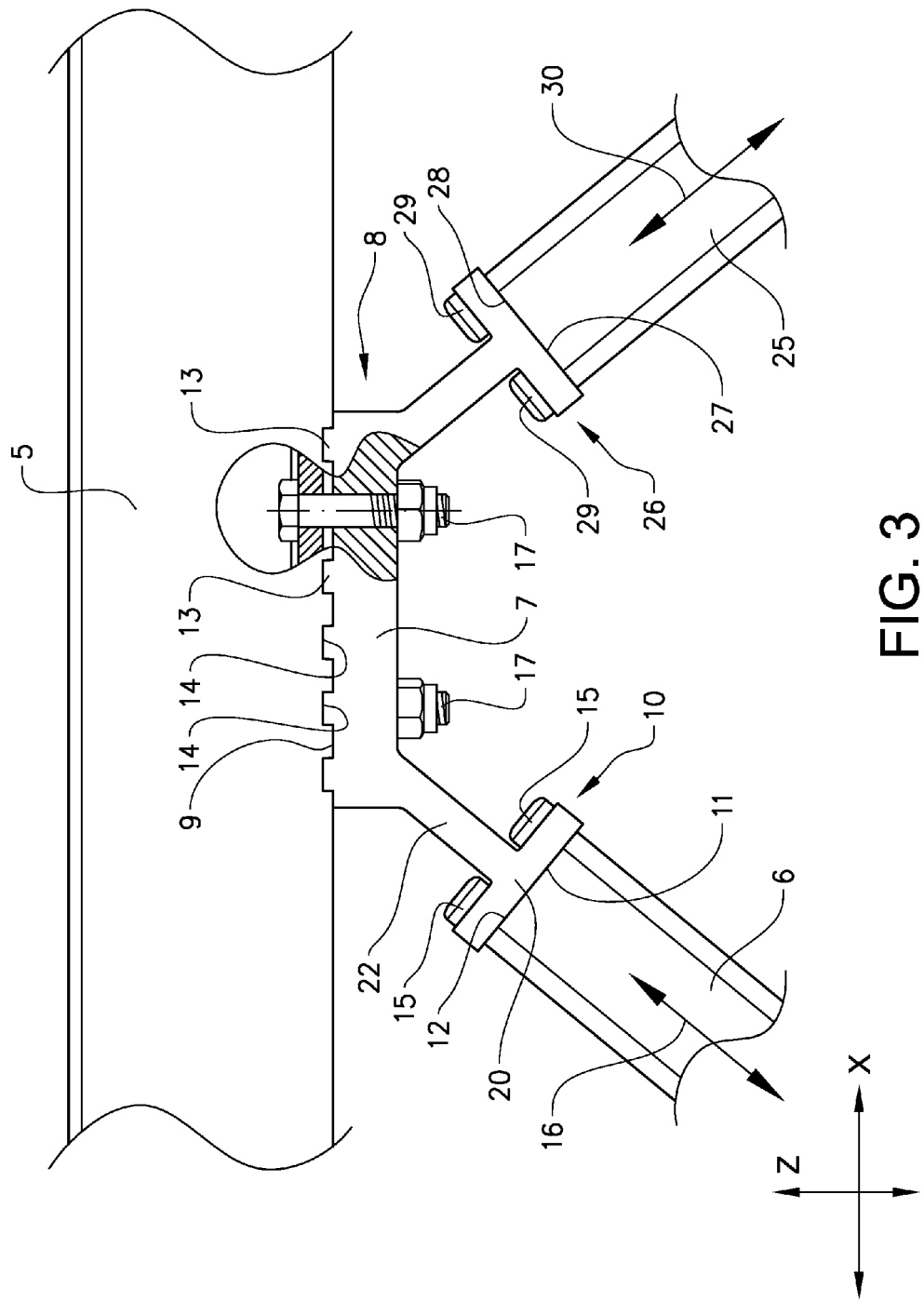
FIG. 3 shows a side view of the mechanical coupling arrangement according to the invention.
Figure 4:
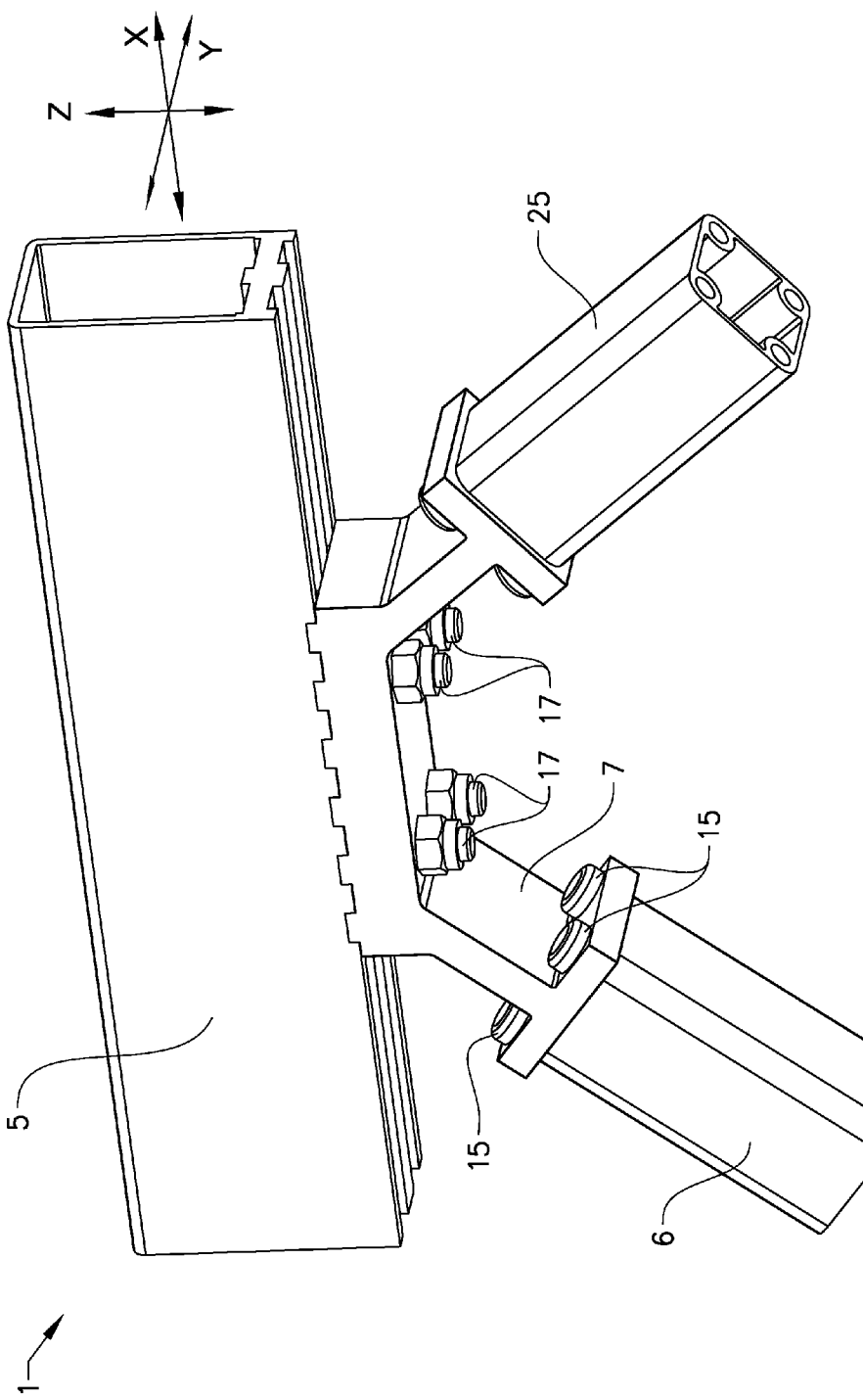
FIG. 4 shows a perspective view of the mechanical coupling arrangement of FIG. 3.
Figure 5:
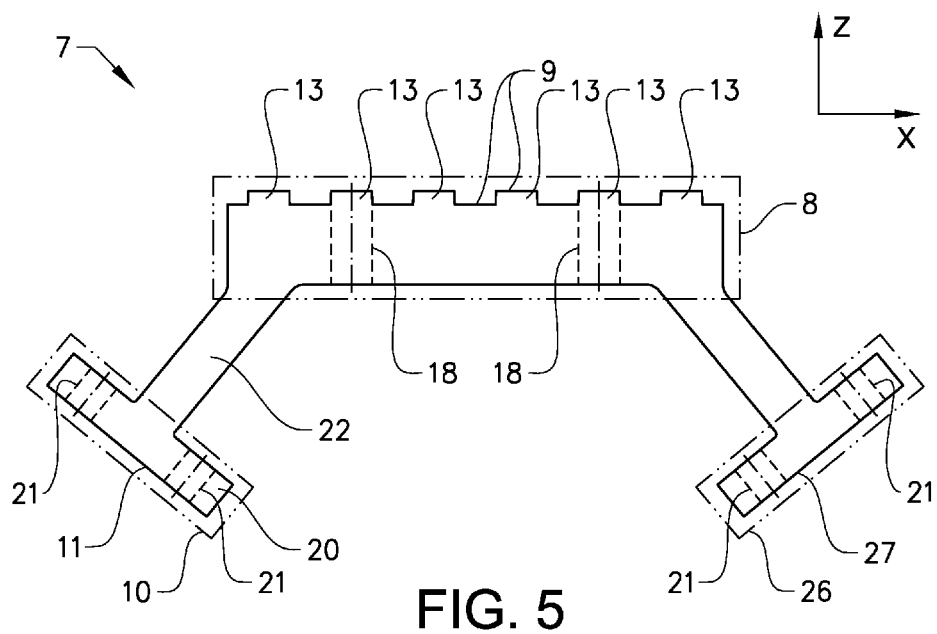
FIG. 5 shows a side view of the connector element according to the invention.

FIG. 3 shows schematically a side view of the mechanical coupling arrangement 1 according to the first embodiment of the invention, FIG. 4 shows a corresponding three-dimensional view of the same arrangement, and FIG. 5 shows the connector element 7 as a separate part before assembly. The connector element 7 comprises a first attachment portion 8 having a first contact surface 9 in contact with the first chord member 5. The first contact surface 9 comprises a plurality of rib-shaped projections 13 extending in the transverse direction Y, wherein each rib-shaped projection 13 is engaged in a corresponding groove-shaped recess 14 arranged in said first chord member 5. This type of arrangement may also be labelled mortise and tenon joint.

The first contact surface 9 is arranged to be pressed against said first chord member 5 by means of a plurality of fasteners 17, which are preferably provided with threads and arranged in holes 18 of the first attachment portion 8, and in a corresponding holes 19 of the first chord member 5. Other means of clamping the first contact surface 9 against the first chord member 5 are possible within the scope of the invention. For example the fasteners 17 may be arranged in cut-outs instead of holes. A cut-out is here defined as hole being laterally open in direction, such that the fastener 17 may be inserted laterally in said cut-out, thus simplifying assembly of the fastener 17. The first chord member 5 may also be provided with a longitudinal flange that comprises the corresponding holes 19. This arrangement simplifies assembly further because the fastener 17 may be arranged on the outside of the first chord member 5, thus simplifying handling of the fastener 17 during assembly. Moreover, in case of a threaded fastener, there is no longer a need for any fixing means for securing the head of a threaded fastener 17 against rotation within the first chord member 5. This might otherwise be arranged by means of internal channels 32 extending within the first chord member 5. The threaded fastener 17 may consist of a screw that is arranged to engage a nut, or a screw that is arranged to engage threads previously made in for example the first chord member 5, or a screw having threads that are arranged to cut or roll threads in corresponding hole 19.

Each rib-shaped projection 13 is arranged to engage a corresponding groove-shaped recess 14. The rib-shaped projections 13 normally extend in the transverse direction Y over the entire transverse length of the connector element 7. This is a result of the manufacturing process, in which the connector element 7 is made of a longitudinal section of an extruded aluminium profile. Hence, firstly a longitudinal aluminium profile is extruded having a cross-section corresponding largely to the desired final shape of the connector element 7. Subsequently, the profile is cut perpendicular to the longitudinal direction of the profile to provide a large number of connector elements 7 originating from each single profile. By providing the extruded profile with lengthwise extending rib-shaped projections 13, these projections 13 will extend over the entire length of the connector element 7, in the direction of extrusion. Moreover, the rib-shaped projections 13 are integrally formed during extrusion of said connector element 7.

Figure 6:
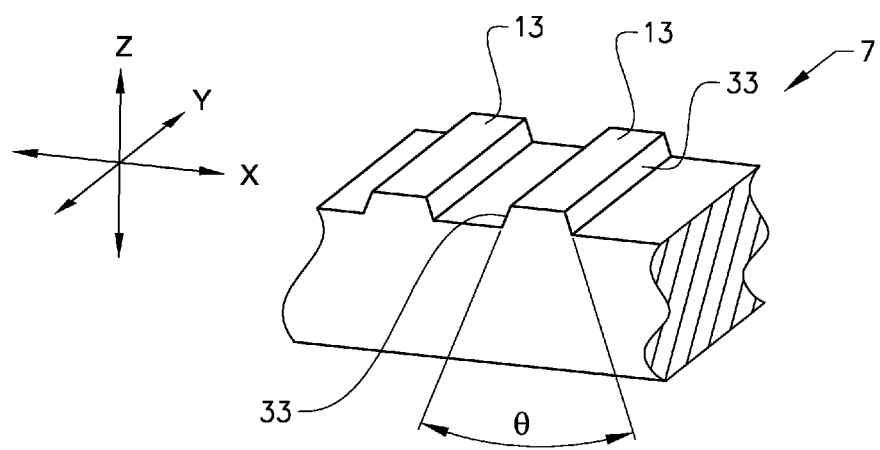
FIG. 6 shows a segment of the inventive connector element having conical rib-shaped projections.

The rib-shaped projections 13 has advantageously a conical cross-sectional shape in a first plane that is defined by said longitudinal direction X and a web direction Z, as illustrated in FIG. 6. The transversal side walls 33 of each projection 13 jointly form an angle θ≠0°. Preferably, the angle θ is within the range of 0.5°-25°. Consequently, a base width in the longitudinal direction X of said at least one rib is larger than a top width in the longitudinal direction X. The conical cross-sectional shape is constant along the entire transversal length of the projection 13. The conical shape of the projection 13 cooperates with the shape of the groove-shaped recess 14, such that a level of play in the connection between said first chord member 5 and said connector element 7 is further reduced, or even eliminated, after pressing together the connector element 7 and the first chord member 5. This is the result of the shape of the groove-shaped recesses 14, which disclose a less conical cross-sectional shape than the conical shape of the projections 13 for the purpose of creating a wedging effect of the rib-shaped projections 13 within the groove-shaped recesses 14. The wedging effect increases with increasing pressing together of the connector element 7 and the first chord member 5. Preferably, the groove-shaped recesses 14 are formed to have a rectangular cross-sectional shape, preferably mechanically produced by a cutting or milling operation after extrusion of said first chord member 5. Said groove-shaped recesses 14 are thus formed by cutting recesses 14 in the first chord member 5 in the transverse direction Y. The groove-shaped recesses 14 preferably extend over the entire length of the first chord member 1 in the transverse direction Y due to simplified manufacturing thereof.

An alternative solution for creating a wedging effect of the rib-shaped projections 13 within the groove-shaped recesses 14 is to provide the corresponding groove-shaped recess 14 with a conical cross-sectional shape in said first plane, and the rib-shaped projections 13 with a less conical cross-sectional shape than the conical shape of the recesses 14. During pressing together of the connector element 7 and the first chord member 5, the level of play in the connection between said first chord member 5 and said connector element 7 is reduced, or even eliminated.

Yet an alternative solution for creating a wedging effect of the rib-shaped projections 13 within the groove-shaped recesses 14 is to oversize the rib-shaped projections 13 with respect to the corresponding groove-shaped recess 14, such that a level of play in the connection between said first chord member 5 and said connector element 7 is reduced, or even eliminated.

The rib-shaped projections 13 and groove-shaped recesses 14 may alternatively exhibit other corresponding shapes, such as undercut shape, or the like. Import is that the rib-shaped projections 13 may be engaged in the groove-shaped recesses 14 to efficiently transfer forces in the longitudinal direction between the first diagonal member 6 and the first chord member 5 only by means of the projections/recesses 13, 14. In total, the size, form and number of projections 13 and corresponding grooves 14 are selected such that all forces in the longitudinal direction X is transferable to the first chord member 5 without exceeding the allowed stress levels of said first chord member 5.

The connector element 7 further comprises a second attachment portion 10, which has a second contact surface 11 in contact with an abutment surface 12 of the first diagonal member 6. The second contact surface 11 is pressed against the abutment surface 12 of the first diagonal member 6 by means of fasteners 15 that preferably are provided with threads. An important aspect of the invention is that the longitudinal direction of the fastener 15 are arranged substantially parallel with a longitudinal direction 16 of the first diagonal member 6, because this configuration guarantees if correct performed a play-free coupling between said parts 6, 7, and a play-free coupling is of outermost importance when assembling a lattice support beam 2 made of mechanical coupling arrangements 1. The inventive concept of a play-free coupling is attained also if the longitudinal direction of the fastener 15 should diverge to a certain extent from parallel with the longitudinal direction 16 of the first diagonal member 6 for any reason. Hence, it is not essential that the longitudinal direction of the fastener 15 is exactly parallel with the longitudinal direction 16 of the first diagonal member 6, but merely sufficiently parallel for allowing the fastener 15 to press the second contact surface 11 against the abutment surface 12. An exact parallel arrangement of the longitudinal direction of the fastener 15 and the longitudinal direction 16 of the first diagonal member 6 is however preferred due to simplified attachment, and maximal obtainable pressure.

The connector element 7 further comprises a planar body portion 22 connecting the first and second attachment portions 8, 10. The planar body portion 22 extend in a plane that preferably is parallel to the longitudinal direction 16 of the first diagonal member 6, such that compression and tension forces of the first diagonal member 6 can be transferred to the first chord member 5 without inducing any bending forces or turning torque in the planar body portion 22 or at its end portions. The planar shape of the planar body portion 22 results from the shape of the extruded profile, from which the connector element 7 is made, and may thus exhibit a non-planar shape of this is desired. According to yet another alternatively, the planar body portion 22 may consist of two planar, or non-planar segments arranged side-by-side to each other. The two segments preferably projects from side regions of the flange 20, and providing a central surface area of the flange for at least one hole arranged to receive a fastener 15. This configuration normally results in a more rigid design. The planar body portion 22 projects from a longitudinal end region of the first attachment portion 8, but the planar body portion may alternatively projects from another area of the first attachment portion 8, such as a central region thereof, thus forming a more compact overall design.

The second attachment portion 10 comprises a flange 20 for coupling the connector element 7 to the first diagonal member 6. The flange has a rectangular shape and comprises a hole 21 arranged in each corner thereof and for receiving the fasteners 15. The holes may be exchanged with cut-outs that only partially surround the fasteners 15 to simplify assembly. The flange 20 is arranged such that a plane of the flange 20 is perpendicular to the longitudinal direction 16 of the first diagonal member 6 for eliminating shear forces in the fasteners 15 as far as possible. The planar body portion 22 projects centrally from the flange 20 to eliminate turning torque of the flange 20 as far as possible. After having described the connector element 7, it is important to note that the connector element 7 in fact is made in a single piece, and that the first attachment portion 8, the planar body portion, and the flange 20 are all integrally formed.

The fasteners 15 are preferably provided with a head and a threaded shank, and the fasteners are preferably threadingly engaged in integrally formed attachment bores 24 of the first diagonal member 6, which preferably have a rectangular cross-sectional shape. The attachment bores 24 are thus arranged in each corner region of the first diagonal member 6. The attachment bores 24 are further preferably formed within an outer wall of the first diagonal member 6, such that a smooth and clean outer surface is attained, simplifying transportation and handling of the first diagonal member 6, as well as improving the aesthetic appearance thereof. The fasteners 15 are preferably thread-forming screws that form threads by tapping or rolling threads within the attachment bores 24 simultaneous to engagement of the fasteners 15. Each diagonal member of the lattice support beam 2 is integrally formed as a single part.

The attachment bores 24 of the first diagonal members 6 may be arranged different from illustrated in FIG. 4. For example, the fastener 15 may depending on the shape of the flange 20 and the first diagonal member 6 engage a central attachment bore of the first diagonal member 6, as long as the longitudinal direction of the fastener 15 are arranged substantially parallel with a longitudinal direction 16 of the first diagonal member 6.

The first diagonal member 6 may alternatively be provided with a flange attached to an end portion of the diagonal member 6, wherein the flange is arranged to mate and couple with the flange 20 of the connector element 7.

The connector element 7 further comprises a third attachment portion 26 having a third contact surface 27 in contact with an abutment surface 28 of a second diagonal member 25, which is also made of preferably hollow extruded aluminium profile. The third contact surface 27 is pressed against the abutment surface 28 of the second diagonal member 25 by means of fasteners 29, which are preferably provided with threads. In order to achieve a play-free coupling is it also here important that the longitudinal directions of the fasteners 29 are substantially parallel with a longitudinal direction 30 of the second diagonal member 25. The design of the first and second attachment portions 10, 26, as well as the first and second diagonal members 6, 25 are preferably identical, wherein only the longitudinal direction 16, 30 thereof differs. The connector element 7 further has a mirror-symmetrical shape with respect to a plane perpendicular to the longitudinal direction X, and arranged in the centre of the mechanical coupling arrangement 1.

Figure 7:
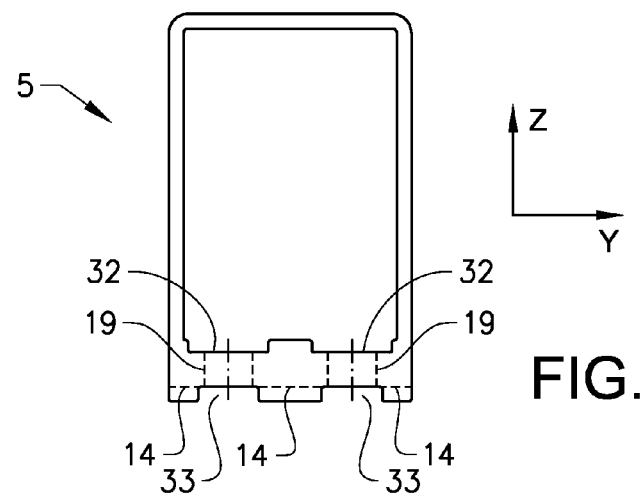
FIG. 7 shows an end view of the first chord member according to the invention.
Figure 8:
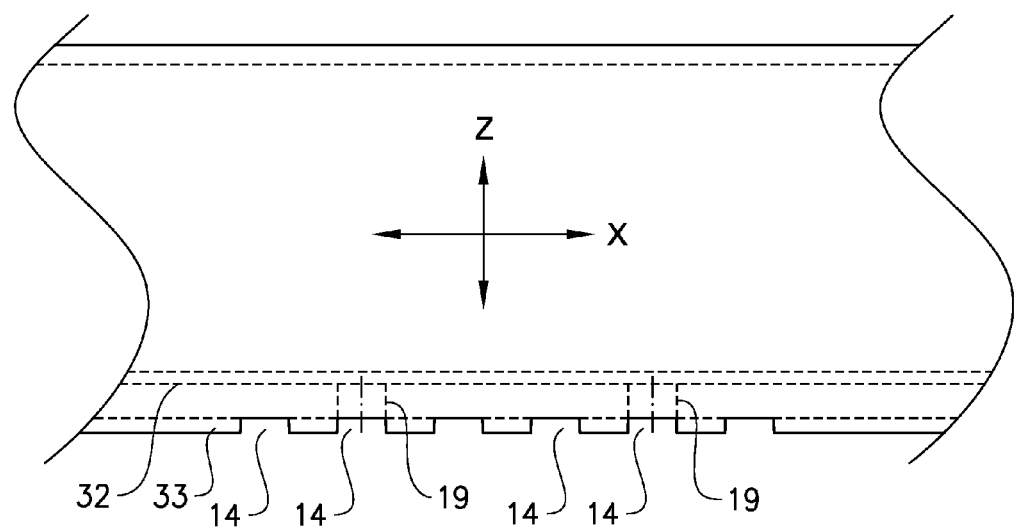
FIG. 8 shows a side view of the first chord member of FIG. 7.

FIG. 7 shows an end view of the first chord member 5, which has a hollow rectangular shape. The internal channels 32 are clearly visible, as well as two external channels 33. The groove-shaped recesses 14 are cut in the material forming the lateral walls of the external channels 33. The external channels thus serve partly to reduce the amount of material that must be removed during manufacturing of the groove-shaped recesses 14, and partly a reinforcement of the wall of the first chord member 5 facing the first contact surface 9. A corresponding side view of the first chord member is shown FIG. 8, wherein the groove-shaped recesses 14 are clearly visible.

Figure 9:
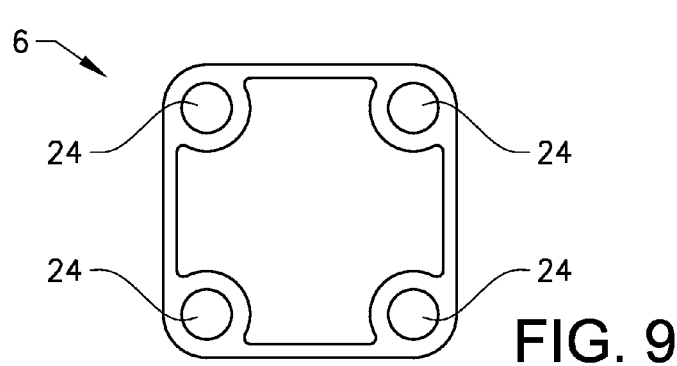
FIG. 9 shows an end view of the first diagonal member according to the invention.

FIG. 9 shows an end view of the first diagonal member 6, which has a hollow rectangular shape and integrally formed attachment bores 24 located in each corner region. The cross-sectional shape is not limited to rectangular, but round, triangular, elliptic shapes, or the like are applicable as alternatives.

A preferred method for manufacturing the mechanical coupling arrangement 1 will be disclosed below. Firstly, the parts forming the mechanical coupling arrangements 1 must be manufactured.

The first chord member 5 is manufactured by extruding a first aluminium profile having a cross-sectional shape corresponding to the cross-sectional shape of the first chord member 5. The first aluminium profile is subsequently cut to have a desired length, and at least one groove-shaped recess 14 is machined in the first chord member 5. The first diagonal member 6 is manufactured by extruding a second aluminium profile having a cross-sectional shape corresponding to the cross-sectional shape of the first diagonal member 6. The second aluminium profile is subsequently cut to have a desired length, and to exhibit at least one abutment surface 12. The connector element 7 is manufactured by first extruding a third aluminium profile having a cross-sectional shape corresponding substantially to the cross-sectional shape of the connector element 7 in a plane perpendicular to the transverse direction Y, and secondly cutting said third aluminium profile in longitudinal sections to produce the individual connector element 7, which is formed to comprise at least a first attachment portion 8 having a first contact surface 9, and a second attachment portion 10 having a second contact surface 11. The first contact surface 9 comprises at least one rib-shaped projection 13 extending in said transverse direction Y.

The cross-sectional shape of the third aluminium profile may differ from the cross-sectional shape of the finished connector element 7 in a plane perpendicular to the transverse direction Y if the design of the connector element requires this, due for example to a specific coupling arrangement, or if the third extruded profile cannot be formed according to the desired final shape of the connector element 7 due to restrictions in the extrusion process. The cross-sectional shape of the third aluminium profile is preferably identical with the cross-sectional shape of the connector element 7 in a plane perpendicular to the transverse direction Y to minimise additional manufacturing steps after extrusion and cutting of the connector element 7. Finally, holes must be formed in the first chord member 5 and the connector element 7 for receiving fasteners during assembly of the mechanical coupling arrangement 1, for example by drilling. Holes for receiving fasteners may alternatively be formed after assembly if the is more convenient.

The step of assembling the first chord member 5, the first diagonal member 6, and the connector element 7 results in contact between the first contact surface 9 and the first chord member 5, contact between the second contact surface 11 and the abutment surface 12, and engagement of the rib-shaped projections 13 with the groove-shaped recesses 14. Thereafter, fasteners 15 are mounted and tightened to press the second contact surface 11 against the abutment surface 12, wherein the longitudinal direction of the fasteners 15 are arranged substantially parallel with a longitudinal direction 16 of the first diagonal member 6. The first attachment portion 8 is also fastened to the first chord member 5 by means of fasteners 17.

The lattice support beam illustrated in FIG. 2 is essentially a two-dimensional beam having two chord members 5, 31 and relatively large extension in the web direction Z in relation to the extension in the transverse direction Y. The mechanical coupling arrangement 1 according to the invention, and as defined by the claims is however equally applicable for fabricating a three-dimensional lattice support beam having three or more chord members, and diagonal members connecting said chord members. For example, a triangular lattice support beam having three chord members, or a rectangular lattice support beam having four chord members. The chord members in such constructions are advantageously designed not only to connect to diagonal members in a single plane, but to connect diagonal members in several different planes, and the cross-sectional shape of the chord members is preferably designed accordingly. Either are the diagonal members from each plane attached to the chord members using connector elements adapted solely for that specific plane, or the connector elements themselves are designed to connect diagonal members from different planes using a single connector element. Moreover, the mechanical coupling arrangement 1 according to the embodiment disclosed in the figures comprise two diagonal members 6, 25, but the mechanical coupling arrangement 1 according to the invention may also be adapted to comprises a single diagonal member 6, wherein the connector element 7 only comprises a first and a second attachment portion 8, 10. Such a connector element 7 would consequently not exhibit a mirror-symmetrical shape with respect to a plane perpendicular to the longitudinal direction X, and arranged in the centre of the mechanical coupling arrangement 1.

The invention is not limited to the specific embodiment presented, but includes all variations within the scope of the present claims. The internal order of the presented manufacturing steps of the mechanical coupling arrangement should not be seen as limiting the scope of protection, and they can be varied within the knowledge of the person skilled in the art. The overall shape of the lattice support beam may of course be varied to form for example a parallel chord beam, as illustrated in FIG. 1, 2, or a pitched, tapered, inverted, or curved beam, or the like. The lattice support beam is mainly configured to be as roof or floor supporting beam in structures comprising a plurality of such lattice support beams arranged substantially horizontal side by side, and jointly carrying a load, wherein the spans of up complete roof or floor might reach for example 40 meters.

The term diagonal member is considered to encompass all different kinds of members interconnecting a first and a second chord member of the lattice support beam, and may also be labelled web member.

The term chord member considered to encompass all different kinds of elongated members that spaced from each other and interconnected by the diagonal members form part of the main structure of a lattice support beam.

The term mechanical coupling arrangement is considered to encompass all non-welded coupling arrangement, i.e. where welding is not used for joining of different parts jointly forming the lattice support beam.

The term lattice support beam is considered to encompass all types of space frame support structures fabricated from a chord members interconnected by web members. Other terms for the same device are lattice joist, lattice truss.

The term fastener is not limited the threaded fasteners, but are considered to encompass all types of fasteners that can generate a compression force for clamping at least two separate parts together. The fastener comprises at least one elongated member defining a longitudinal direction, which elongated member is arranged to exhibit a tensile force counteracting said compression force. The fastener is preferably a threaded fastener having a head and a threaded shank, but may alternatively be formed by a rivet fastener, a huck fastener, a fastener assembly having an elongated member cooperating with a wedge arrangement for generating said compression force, or the like. Identical to all fasteners are that the fastener clamps the connector element with the diagonal members and the first chord member respectively. Furthermore, the clamping force generated by the fastener is aligned with the longitudinal direction of the associated diagonal member.

Reference signs mentioned in the claims should not be seen as limiting the extent of the matter protected by the claims, and their sole function is to make claims easier to understand.

TABLE OF REFERENCE SIGNS

1 Mechanical coupling arrangement
2 Lattice support beam
X Longitudinal direction
Y Transverse direction
5 First chord member
6 First diagonal member
7 Connector element
8 First attachment portion
9 First contact surface
10 Second attachment portion
11 Second contact surface
12 Abutment surface of first diagonal member
13 Rib-shaped projection
14 Groove-shaped recess
15 Fastener
16 Longitudinal direction of first diagonal member
17 Fastener
18 Hole
19 Corresponding hole
20 Flange
21 Hole of flange
22 Planar body portion
Z Web direction
24 Attachment bore
25 Second diagonal member
26 Third attachment portion
27 Third contact surface
28 Abutment surface of second diagonal member
29 Fastener
30 Longitudinal direction of second diagonal member
31 Second chord member
32 Internal channel
33 External channel

What is claimed is:

1. A mechanical coupling arrangement for a lattice support beam, said mechanical coupling arrangement having a longitudinal direction and a transverse direction, and comprising:
   at least a first chord member,
   a first diagonal member, and
   a connector element for joining said first chord member with said first diagonal member, wherein
   each of said first chord member, said first diagonal member, and said connector element is made of extruded aluminum profile;
   said connector element comprising at least a first attachment portion having a first contact surface in contact with said first chord member, and a second attachment portion having a second contact surface in contact with an abutment surface of said first diagonal member;
   said first contact surface comprising at least one rib-shaped projection running in said transverse direction and engaged in at least one corresponding groove-shaped recess arranged in said first chord member;
   said second contact surface is pressed against said abutment surface of said first diagonal member by means of at least one fastener penetrating through the second attachment portion, wherein the longitudinal direction of the at least one fastener is arranged substantially parallel with a longitudinal direction of said first diagonal member.

2. The mechanical coupling arrangement according to claim 1, wherein said first contact surface is pressed against said first chord member by means of at least one fastener.

3. The mechanical coupling arrangement according to claim 2, wherein said at least one fastener is arranged in a hole or cut-out of said first attachment portion, and in a corresponding hole or cut-out of said first chord member.

4. The mechanical coupling arrangement according to claim 1, wherein said connector element is made of a longitudinal section of said extruded aluminium profile.

5. The mechanical coupling arrangement according to claim 1, wherein said second attachment portion comprising a flange, which comprising at least one hole or cut-out located therein, which hole or cut-out at least partly surrounds said at least one fastener.

6. The mechanical coupling arrangement according to claim 5, wherein said flange having a rectangular shape and comprising one hole or cut-out in each corner region thereof.

7. The mechanical coupling arrangement according to claim 5, wherein said connector element further comprising at least a planar body portion connecting said first and second attachment portions, wherein a plane of said flange is perpendicular to a plane of said planar body portion.

8. The mechanical coupling arrangement according to claim 1, wherein said first contact surface comprising at least two rib-shaped projections extending in said transverse direction and engaged in at least two corresponding groove-shaped recesses arranged in said first chord member.

9. The mechanical coupling arrangement according to claim 1, wherein said at least one rib-shaped projection extends in said transverse direction over the entire transverse length of said connector element.

10. The mechanical coupling arrangement according to claim 1, wherein said at least one rib-shaped projection having a conical cross-sectional shape in a first plane defined by said longitudinal direction and a web direction, and said at least one corresponding groove-shaped recess having a conical cross-sectional shape in said first plane, such that a level of play in the connection between said first chord member and said connector element is reduced.

11. The mechanical coupling arrangement according to claim 1, wherein said at least one rib-shaped projection is integrally formed during extrusion of said connector element, and in that said at least one corresponding groove-shaped recess of said first chord member is mechanically produced, preferably by a cutting or milling operation, after extrusion of said first chord member.

12. The mechanical coupling arrangement according to claim 1, wherein said at least one fastener is provided with threads, and said first diagonal member is provided with at least one integrally formed attachment bore for threadingly receiving said at least one fastener.

13. The mechanical coupling arrangement according to claim 1, wherein said mechanical coupling arrangement further comprising a second diagonal member made of extruded aluminium profile;
  said connector element further comprising a third attachment portion having a third contact surface in contact with an abutment surface of said second diagonal member;
  said third contact surface is pressed against said abutment surface of said second diagonal member by means of at least one fastener, whose longitudinal direction is substantially parallel with a longitudinal direction of said second diagonal member.

14. A lattice support beam comprising at least a first chord member, a second chord member, a plurality of diagonal members, wherein said lattice support beam further comprising a plurality mechanical coupling arrangements according to claim 1 for joining said at least first and second chord members with said plurality of diagonal members.

15. The mechanical coupling arrangement according to claim 1, wherein said first contact surface comprising at least three rib-shaped projections extending in said transverse direction and engaged in at least three corresponding groove-shaped recesses arranged in said first chord member.

16. The mechanical coupling arrangement according to claim 1, wherein said at least one rib-shaped projection having a conical cross-sectional shape in a first plane defined by said longitudinal direction and a web direction, or said at least one corresponding groove-shaped recess having a conical cross-sectional shape in said first plane, such that a level of play in the connection between said first chord member and said connector element is reduced.

17. The mechanical coupling arrangement according to claim 1, wherein said fastener is a separate entity.

18. The mechanical coupling arrangement according to claim 1, wherein the longitudinal extension of the rib-shaped projection is parallel to said transverse direction.

19. The mechanical coupling arrangement according to claim 1, wherein the longitudinal direction of said mechanical coupling arrangement is parallel to said at least one first chord member at the location of the mechanical coupling arrangement.

20. A method for manufacturing a mechanical coupling arrangement for a lattice support beam, said mechanical coupling arrangement having a longitudinal direction and a transverse direction, and comprising at least a first chord member, a first diagonal member, and a connector element for joining said first chord member with said first diagonal member, said method comprising:
  extruding and cutting a first aluminium profile forming said first chord member;
  machining at least one groove-shaped recess in said first chord member;
  extruding and cutting a second aluminium profile forming said first diagonal member comprising an abutment surface;
  extruding a third aluminium profile having a cross-sectional shape corresponding substantially to the cross-sectional shape of the connector element in a plane perpendicular to the transverse direction;
  cutting said third aluminium profile in longitudinal sections to produce at least one separate connector element comprising at least a first attachment portion having a first contact surface, and a second attachment portion having a second contact surface, wherein said first contact surface comprising at least one rib-shaped projection running in said transverse direction;
  assembling at least said first chord member, said first diagonal member, and said connector element, such that said first contact surface contacting said first chord member, said second contact surface contacting said abutment surface, and said at least one rib-shaped projection engaging said at least one groove-shaped recess; and
  pressing said second contact surface against said abutment surface by means of at least one fastener penetrating through the second attachment portion, wherein the longitudinal direction of the at least one fastener is arranged substantially parallel with a longitudinal direction of said first diagonal member.

* * * * *